United States Patent [19]

Long

[11] Patent Number: 5,328,403
[45] Date of Patent: Jul. 12, 1994

[54] APPARATUS FOR TENDERIZING MEAT

[76] Inventor: John B. Long, 988 Blvd. of the Arts, No. 212, Sarasota, Fla. 34236

[21] Appl. No.: 115,566

[22] Filed: Sep. 3, 1993

Related U.S. Application Data

[62] Division of Ser. No. 898,589, Jun. 15, 1992, Pat. No. 5,273,766.

[51] Int. Cl.⁵ .............................................. A22C 9/00
[52] U.S. Cl. ...................................... 452/141; 426/58; 426/238
[58] Field of Search ............... 452/141; 426/55, 58, 426/238

[56] References Cited

U.S. PATENT DOCUMENTS

| | | | |
|---|---|---|---|
| 2,544,681 | 3/1951 | Harsham et al. | 426/55 |
| 2,830,912 | 4/1958 | Simjian | 426/238 |
| 2,880,663 | 4/1959 | Simjian | 426/58 |
| 2,881,080 | 4/1959 | Simjian | 426/58 |
| 2,902,712 | 9/1959 | Simjian | 452/141 |
| 2,980,537 | 4/1961 | Hagen | 426/238 |
| 3,492,688 | 6/1966 | Godfrey | 452/141 |
| 3,711,896 | 1/1973 | Guberman et al. | 452/141 |
| 4,353,928 | 10/1982 | Seliger et al. | 426/238 |
| 4,504,498 | 3/1985 | Kissam | 426/238 |

Primary Examiner—Willis Little
Attorney, Agent, or Firm—Sheridan Neimark

[57] ABSTRACT

Tenderized meat of good quality and uniformity is obtained by supporting meat in a tank along a hemispherical wall equidistant from an explosive charge, and detonating the explosive. The shock wave produced is propagated through the water within the tank, couples with the meat to compress the meat as the shock wave strikes the meat, and then is reflected by the tank wall to effect a substantial doubling of the shock wave effect.

13 Claims, 4 Drawing Sheets

APPARATUS FOR TENDERIZING MEAT

This is a division of application Ser. No. 07/898,589 filed Jun. 15, 1992 now U.S. Pat. No. 5,273,766.

FIELD OF THE INVENTION

The present invention relates to tenderizing meat and, more particularly, to a method and apparatus for producing tenderized meat in a more efficient and effective manner than has been heretofore available.

BACKGROUND

The need exists for an improved system for tenderizing meat. A dichotomy exists in the fact that the public demands meat which is tender, yet the lower the fat content of the meat the greater the toughness and the public is becoming increasingly aware that the consumption of fat is unhealthy. In addition to the health advantages in tenderizing low fat meats, there is also an economic advantage because low fat meat is generally less expensive than high fat meat.

Many methods have been used in the past or at least suggested for tenderizing meat. The most common is simple mechanical pounding; but pounding breaks the meat fibers and changes both the texture and appearance of the meat. So-called "aging", which involves storage of the meat at a controlled temperature, e.g. 35°–40° F., for three or four weeks, has also been commonly used, but this type of operation is actually a controlled putrefaction which is expensive and slightly alters the flavor of the meat.

It is also been proposed to treat meat chemically, e.g. with tenderizing enzymes or in a chemical bath, but this type of treatment acts primarily only on the meat surface and tends to degrade the meat texture, i.e. make it "mushy". Other suggested methods include pulse massage and ultrasonic waves introduced in water into which the meat has been submerged, but these methods have proven largely ineffective.

The 1970 U.S. Pat. No. 3,492,688 in the name of Godfrey discloses a method and apparatus for tenderizing meat by the use of an explosive charge which generates and applies a shock front pressure wave propagated through a liquid medium at velocities exceeding the speed of sound. It is stated that the meat may be placed in a protective wrapping such as a flexible bag made of rubber or plastic material, from which the air has been evacuated.

While the principle behind the Godfrey U.S. Pat. No. '928 is sound, the embodiments disclosed and especially the tank and position of the meat in relation to the tank and explosive charge would present serious difficulties in the commercial tenderizing of meat. In the illustrated embodiments the meat would be thrown against the tank walls or the tank cover. Another problem is that in order to have an effective shock wave, a certain minimum explosive force is required; when such a minimum explosive charge is utilized, however, the force is sufficiently great to blow off the top of the container of the Godfrey apparatus. Accordingly, and insofar as is known, the Godfrey system has never achieved actual utilization.

SUMMARY OF THE INVENTION

It is, accordingly, an object of the present invention to overcome deficiencies in the prior art, such as those indicated above.

It is another object of the present invention to provide an improved system including both method and apparatus for tenderizing meat.

It is a further object of the present invention to add value to meat, to provide tender meat at a lower cost, and to improve the quality of meat which is lower in fat content so as to make such lower fat content meat available for commercial and household use in keeping with contemporary less fat food requirements.

These and other objects are achieved according to the present invention by immersing the meat in a specially shaped tank filled with water, the meat being vacuum sealed in a protective sheath and supported against a hard surface, preferably the wall of the specially shaped tank. A shock wave is produced by detonating an explosive charge placed at a location substantially equidistant from the tank wall supported meat. The shock wave, propagated through the water, couples with the meat whereby the meat is compressed as the front of the shock wave strikes and then passes through the meat. After the shock wave passes through the meat, the meat is stretched, breaking the connecting fibers in the meat but not rupturing the meat cell walls. The shock waves strikes the meat supporting surface, e.g. the wall of the tank, and is then reflected back through the meat to achieve a substantial doubling of the shock wave effect.

The actual time it takes for the shock wave to pass through the meat is on the order of 125 microseconds. The shock pulse produced is several feet wide, travels at 18,000–20,000 feet per second and produces a pressure of about 10,000 psi. The process can be carried out on frozen meat as well as fresh meat, and on poultry, e.g. chicken and turkey, as well as beef, pork, mutton, veal and lamb.

BRIEF DESCRIPTION OF THE DRAWING

The above noted and other objects and the nature of and advantages of the present invention will be more apparent from the following detailed description of certain embodiments thereof, taken in conjunction with the drawing, wherein.

DETAILED DESCRIPTION OF EMBODIMENTS

Figure 1:
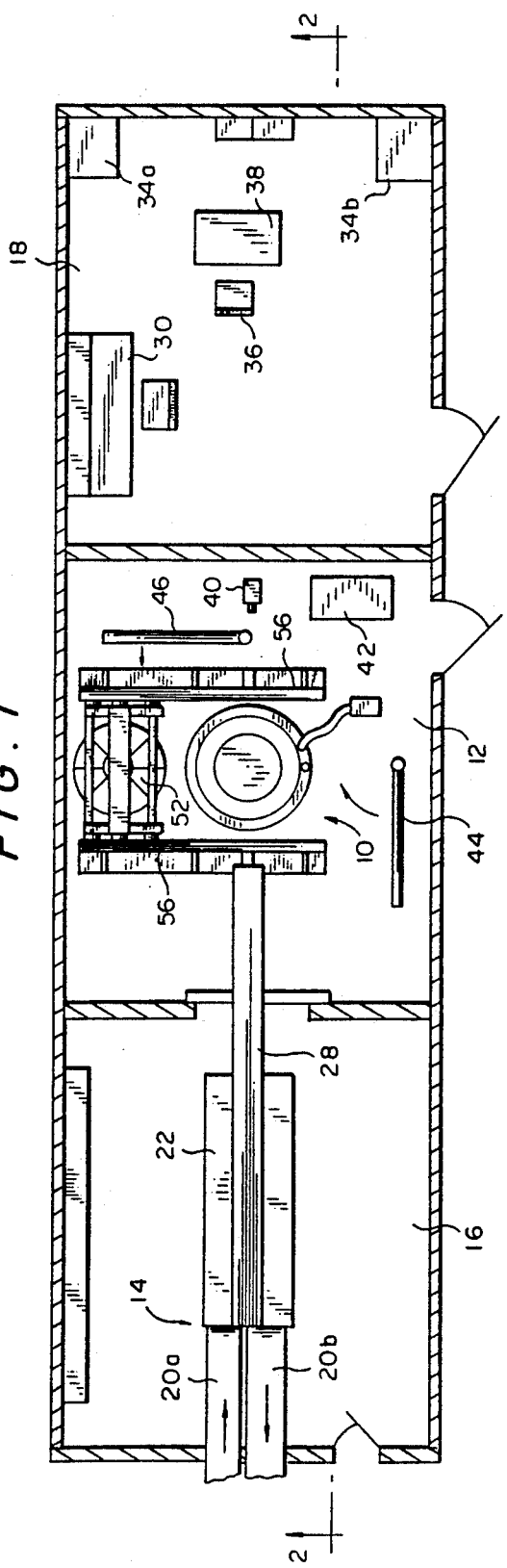
FIG. 1 is a plan view of a three-room plant or factory including apparatus for handling, controlling and tenderizing meat in accordance with the present invention.
Figure 2:
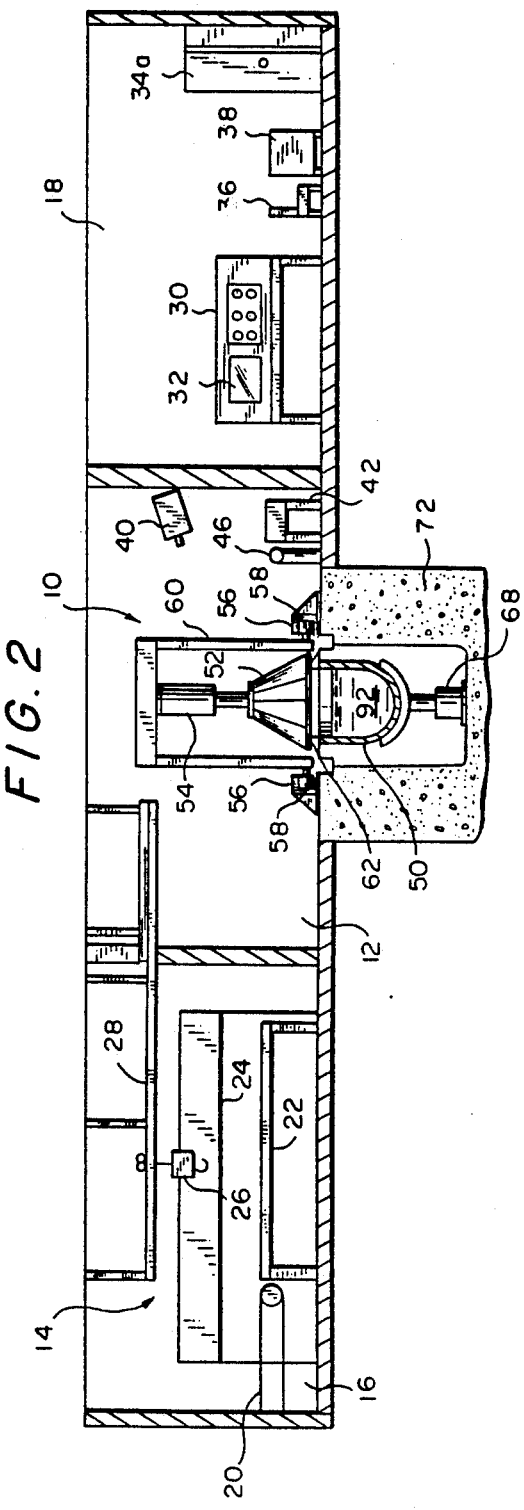
FIG. 2 is a sectional/elevational view taken along line 2—2 of FIG. 1.

FIGS. 1 and 2 show in general an apparatus 10 for tenderizing meat, located in a first room 12. Suitable apparatus 14 is provided primarily in a second room 16 for transferring the meat from a storage or delivery location to the tenderizing apparatus 10. A third room 18 is provided for storage of explosive and for monitoring and control of the tenderizing process and apparatus.

In more detail, and still with reference to FIGS. 1 and 2, the apparatus 14 in the room 16 comprises a conveyor belt system 20 including a delivery belt 20a and a removal belt 20b for the movement of meat to be tenderized from an exterior location, e.g. a delivery port or a storage room, to the room 16, and for removal of unused materials therefrom; an assembly table 22 on which the meat is prepared; a steam and wash rack 24; and a hoist 26 for movement along a rail 28 for transport of the prepared meat from the room 16 to the room 12.

The control and storage room 18 contains a control console 30 with a TV monitor 32. In addition, there may be provided storage facilities 34a and 34b for separate storage of solid and liquid components of a suitable explosive to be used in the tenderizing operation. In addition, there may be optionally provided a chair 36 and desk 38.

The main part of the present apparatus is the tenderizing apparatus in the room 12 as illustrated in FIGS. 1 and 2 and in more detail in FIGS. 3–5, and as explained in more detail below. The room 12 also contains a TV camera 40 electronically/optically connected to the monitor 32. Also provided is a work table 42 for assembly of the explosive. A water delivery pipe 44 for rapid filling of the tank and a water vacuuming pipe 46 for water removal are also provided, these pipes being mounted for pivotal movement so that they can swing over and engage with the tank.

The key elements of the tenderizing apparatus are the water and meat holding tank 50 properly supported as described below, and a water deflecting cone or shield 52 properly supported in an explosion resisting manner by a recoil mechanism, e.g. an hydraulic recoil cylinder 54. As best shown in FIG. 1, the water deflecting cone 52 and the hydraulic recoil cylinder 54 are supported for a lateral movement on suitable rails 56, carried by wheels 58 which support suitable struts 60. Adjacent to and surrounding the tank 50 is provided a suitable splash and collection gutter 62 of annular configuration, and an annular splash collector 64 therebetween.

Figure 3:
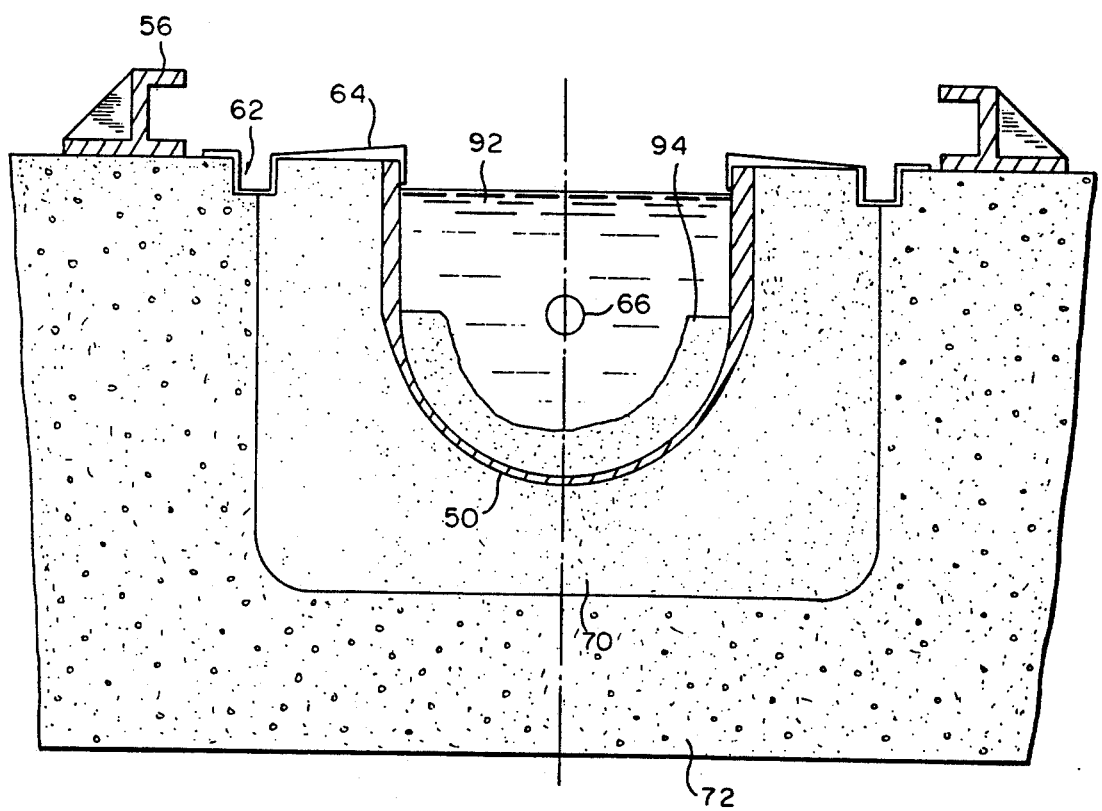
FIG. 3 is a sectional view of a part of the apparatus of FIGS. 1 and 2, focusing on the tank in which the tenderizing is effected.

As can be seen in FIGS. 2 and 3, the upper part of the tank 50 may be provided with a cylindrical configuration whereas the lower part of the tank importantly has a shape, preferably hemispherical, which places its wall equidistant from the explosive charge location 66.

Because of the substantial force generated by the explosion, it is important that the tank 50, desirably of stainless steel, be adequately supported. In the embodiment of FIG. 3, the tank 50 is supported by a bed of sand 70 which is in turn supported within a concrete pit 72. In accordance with FIG. 2, the support is provided by an appropriate hydraulic recoil cylinder 68 similar to, but even stronger than, the recoil cylinder 54. It will be understood that the force of the explosion is very great, and will tend to cause both recoil mechanisms 54 and 68 to give, effecting some separation of the shield 52 from the tank 50, and this causes an extension of the impulse over a longer term and a decrease in the force per unit of time.

Figure 4:
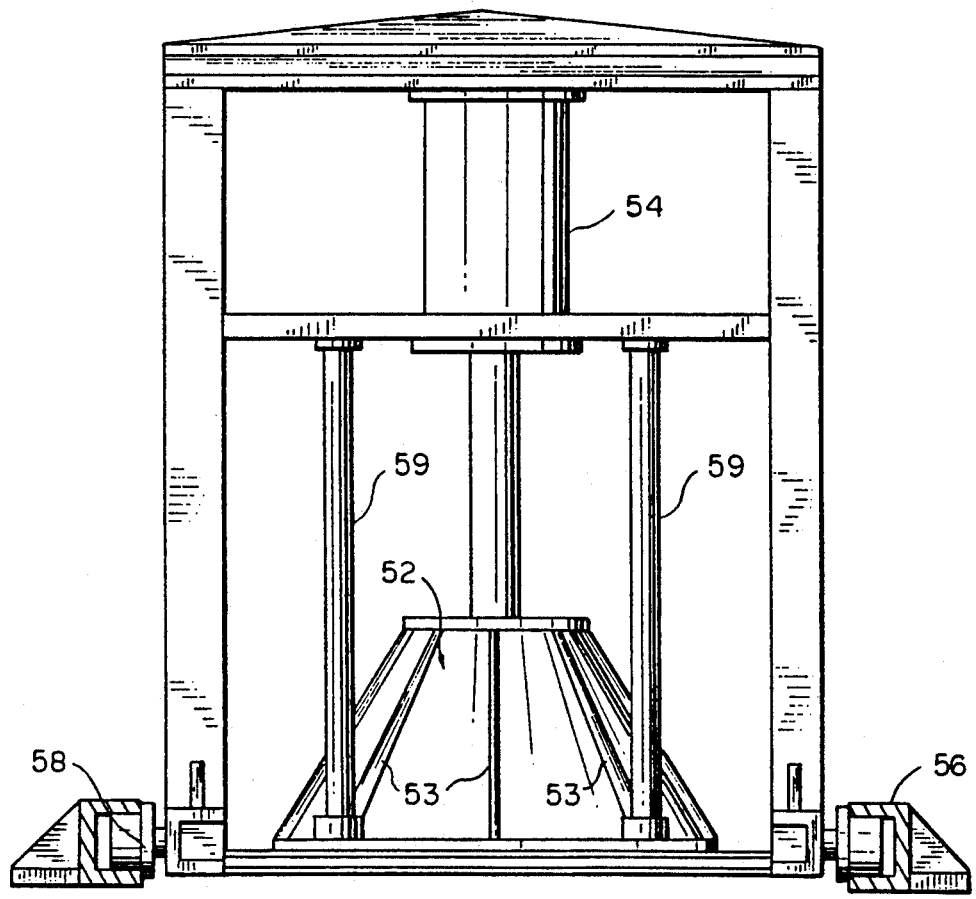
FIG. 4 is an elevational view of a part of the apparatus shown in FIGS. 1 and 2, focusing on a covering means for the tank of FIG. 3.
Figure 5:
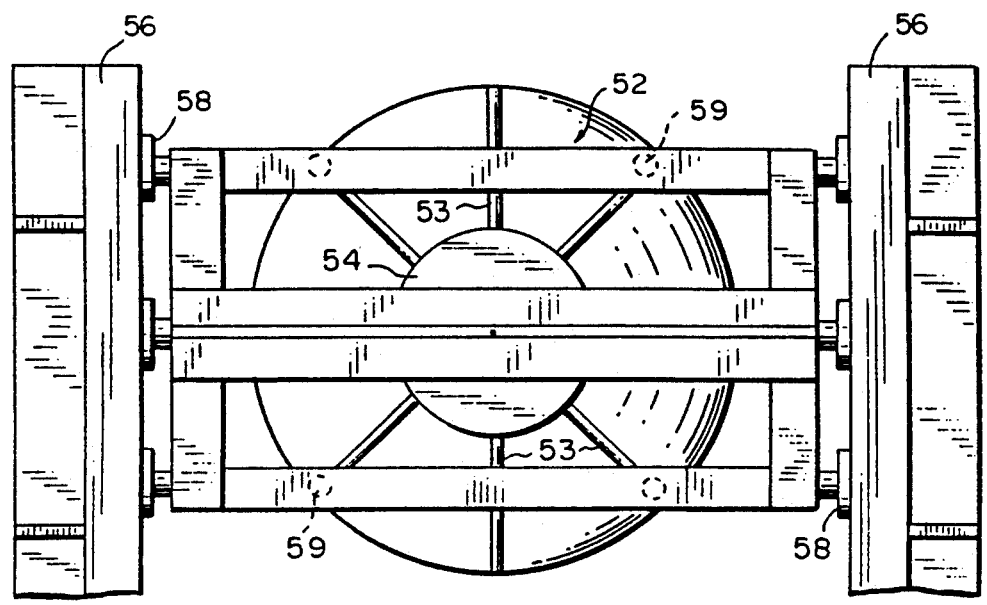
FIG. 5 is a plan view of the device of FIG. 4.

FIGS. 4 and 5 provide enlarged views of the superstructure for supporting the water deflecting cone 52 and the hydraulic recoil cylinder 54. In addition to what is shown in FIG. 2, FIG. 4 shows guide rods 59 to help maintain the water deflecting cone 52 in its proper position immediately following the explosion. Like the tank 50, the water deflecting cone 52 is preferably formed of stainless steel, most preferably of heavy duty stainless steel having reinforcing ribs 53 on its outer surface.

Figure 6:
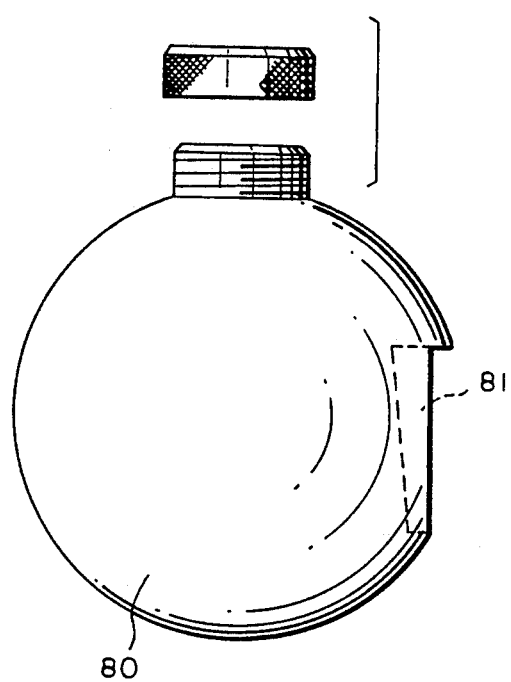
FIGS. 6–8 are elevational views of containers for a two-part explosive preferably used in the system of the present invention.
Figure 7:
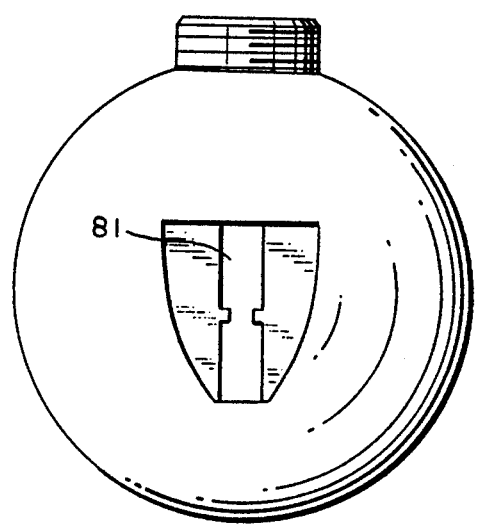
Figure 8:
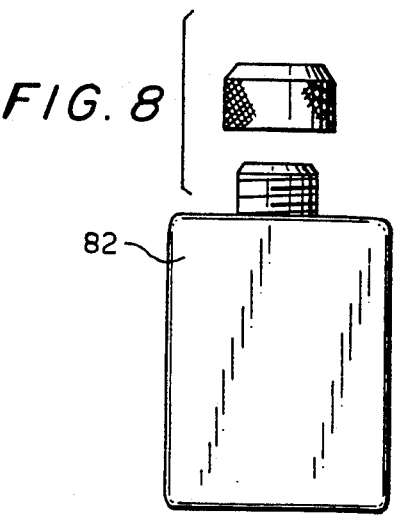

FIGS. 6–8 merely show convenient containers 80 and 82, respectively for holding the solid component and the liquid component of the preferred two component explosive used in the present invention. The container 80 is suitably formed of a frangible material and is provided with a depression or recess 81 into which a blasting cap may be inserted. The liquid component from the explosive is merely poured from the container 82 into the container 80 which already contains the solid component, and the container 80 is then ready for placement along with the meat to be tenderized in the tank 50.

When the explosive charge is detonated, a pulse or pressure wave is generated. The pulse time at 1.5 to 2 ft. from the explosive center is about 250 microseconds. If the pulse travels at 20,000 ft. per second, the pulse length at a two-foot distance from the explosion center would be 5 ft. The pulse passes through the meat, is reflected back by the meat supporting wall and then crosses the incoming pulse. When the reflected pulse intersects the incoming pulse, it doubles the pressure. For the meat to be tenderized uniformly, it should be exposed equally to shock energy. The meat at 2 ft. from the explosion receives only about one-half the energy of the meat at 1.5 ft. from the explosion center. It is the reflection from the meat supporting tank wall which tends to even out the shock energy throughout the thickness of the meat.

The theory on which the present invention is based is known. Thus, in shock hydrodynamics, a shock wave generated in a fluid will be reflected from an object in its path unless the properties of that object are such that they are an acoustic match with the fluid in which the shock wave is generated. An acoustic match between the fluid and the object will occur when the Bulk Modulus divided by the density of each substance is nearly equal. If there is such a match between the object in the fluid and the fluid itself, the shock wave is not reflected but passes through the object in the same manner that it progresses through the fluid. The flesh of mammals, fish, fowl, and reptiles all exhibit a reasonable acoustic match with water. Therefore a shock wave generated in water, instead of being reflected from the flesh, passes through the flesh. In advance of the shock wave pressures are developed in the range of several thousand pounds per square inch. Thus, the flesh in advance of the shock wave is rapidly compressed. As the wave passes, a rarefaction occurs resulting in a rapid stretching of the flesh. This action produces the desired tenderizing.

However, because the object must exhibit a reasonable acoustic match with water, the present system does not work as well with meat which contains bones, i.e. there is no close acoustic match between bones and water. Thus, comparative examples carried out according to the present invention but using unboned sides of beef were not fully successful. The bones, being a poor acoustic match for the water, reflected the shock wave, and as a result the tenderizing was not sufficiently uniform to meet commercial standards.

Another requirement is that the meat be wrapped and sealed in plastic and/or rubber, with all air being evacuated between the wrapping and the meat; this is in any event a pre-existing condition for most meat to be used which is already vacuum packed at the processing plant. Comparative examples showed that uncontained meat exposed to water and shock changed color to a grayish white, rendering the meat commercially unacceptable. When wrapped in plastic and/or contained in a rubber bag, there was no change in appearance. In addition, it will be understood that the meat must be isolated from the water in which the explosion takes place from the standpoint of possible contamination from explosive by-products. Other comparative examples showed that failure to evacuate air from between the rubber bag containing the meat and the meat resulted in high compression and heating of the trapped air which tended to burn holes in both the bag and the meat. Most desirably, the meat is protected from the water in the tank by two membranes, namely an inner plastic wrapping and an outer rubber bag.

Important features of the present invention involve, as partly already explained above, providing the tank with a proper shape, placing the meat against a hard reflective wall, preferably the tank wall, so that it is supported at its back side by the reflective wall and so that a substantial doubling of the shock wave effect is achieved, and proper placement of the explosive in the tank so that all the meat is placed approximately equidistant from the explosive charge. In addition, it is necessary to properly select the amount of the explosive charge and the distance of the meat from the explosive center so as to produce the desired tenderization. The substantial doubling of the shock wave by reflecting the wave from the tank wall back through the meat is particularly important in achieving uniform tenderizing of the meat; for example, a slab of beef six inches thick has its back side subjected to 28% pressure drop as compared to its front side in the absence of a reflected shock wave, whereas the same slab has its back side subjected to only 7.6% pressure drop as compared to its front side when the wave is reflected back through the meat.

Although examples are given below, the above noted parameters can be determined experimentally for each particular installation, bearing in mind that the explosive effect decreases as the cube of the distance from the explosive charge. Doubling the distance from the explosive charge produces $\frac{1}{8}$ the energy, i.e. $2^3$. For example, to produce the same effect at a distance of 2 feet that is produced at 1 foot distance of the meat from the explosive charge requires eight times the quantity of the same explosive charge.

In one example using the particular explosive described below, the diameter of the tank 50 was selected to be 48 inches with the explosive placed at location 66 as shown in FIG. 3 and the tank filled with water 92. Six hundred pounds of meat 94 protected within an evacuated rubber container was then placed along the hemispherical floor of the tank 50 as shown in FIG. 3 in a layer of approximately six inches thickness. The front face of the meat was thus approximately 18 inches from the explosive center while the back of the meat was approximately 24 inches from the explosive center.

As indicated above, it is preferred that a two-part explosive be used in the practice of the present invention, although it will be understood that any explosive may be used, e.g. 100 grams of composition B or of composition C-4 plastic explosive detonated in water at a distance of one foot from the meat in the apparatus of FIG. 3 produces a fully satisfactory product. The preferred two-part explosive is available from Thermex Energy Corp. and is composed of components which are separately inert and not classified as explosives. For purposes of shipping, the solid component is classified as an oxidizer and the liquid component is classified as a flammable liquid. When the two components are mixed, the result is a class A explosive the energy released of which is 130% of TNT per unit of weight, a yield almost exactly equal to composition B, a well known explosive.

The solid component is a specially prepared ammonium nitrate composition with glass microballoons and plastic resin, and the liquid component is nitromethane. The shelf life of the solid component in a sealed container such as the container 80 is indefinite. The shelf life of the mixed components is quoted by Thermex to be one year in a sealed container, degradation of the mixed components being due to the volatility of the liquid component and the fact that the mixture is slightly hygroscopic.

A container such as the container 80, filled with the solid component, has a packing fraction of approximately 66%, leaving about one-third of the volume as void capable of accepting the liquid component which fills the interstices between the particles of the solid component. Mixing of the two components takes from about two minutes to about thirty minutes, depending on the size and geometry of the container.

There are a number of advantages in utilizing a two-part explosives, these falling within the three general categories of safety, ease of handling and storage, and overall economy. Because the two components are relatively safe when unmixed, special facilities required for the normal handling of explosives are not necessary, e.g. there are no requirements for explosion proof switches and lights, special wiring, special floor covering, spark proof equipment, etc. As regards shipping, the separate components can be shipped as normal freight by truck, ship and air, and even by United Parcel; the special and costly requirements for the shipping of explosives are not necessary. Until the two components are mixed, no precautions, otherwise required of other high explosives, need be used.

Other advantages of the preferred two-part explosive are that even after it is mixed it is less sensitive than TNT or composition B, and can be submerged in water for up to six hours without adverse effect. Moreover, the preferred two-part explosive is inexpensive and produces only gaseous by-products, predominantly carbon dioxide and nitrogen dioxide along with some carbon monoxide and hydrogen.

In examples carried out according to the present invention, the container 80 had a diameter of 2-$\frac{1}{8}$ inches and had a capacity sufficient for one-half pound of mixed explosives. The weight of the solid component was 169 grams and the weight of the liquid component was 58 grams corresponding to 51.5 cc.

A series of examples were carried out using the parameters as pointed out above, using frozen blocks of boned meat as well as non-frozen meat. The boned meat was sealed in a plastic container and evacuated, and the sealed plastic container was placed in a sealed rubber bag and the air evacuated from the space between the bag and plastic container. The meat, thus contained, was submerged in water and placed as shown in FIG. 3 against the tank wall with the explosive charge, as described above, placed in position 66. The explosive charge was then detonated.

After detonation, the rubber bag containing the tenderized meat was removed from the water, the plastic wrapped meat removed from the rubber bag, and both the bag and the plastic wrapped meat washed in fresh water. The meat was ready for shipment and the rubber bag ready for reuse. The meat was removed from its wrapping and tested. The meat produced was markedly more tender than non-tenderized control meat. The flavor and texture of the tenderized meat remained unchanged from the control meat. The results were equal with frozen meat and non-frozen meat.

A pathological examination of flesh through which a shock wave had passed was made. Nominal flesh seen under a microscope shows numerous small white ropes, connecting tissue linking groups of cells. Flesh through which a shock wave had passed showed the majority of the connecting tissues to be ruptured. The appearance of the meat to the eye was unchanged. However, a two inch thick steak after being shocked seemed much more limber.

Based on the examples carried out, the following conclusions are to be drawn:

The mean should be at a uniform distance from the explosive center, and the meat preferably should be about six inches thick with nothing interposed between the explosion center and the meat other than the wrappings and the water in which the meat is placed. If the meat is more than about eight inches thick, the back side becomes noticeably less tenderized than the front side. If the thickness is less than about four inches, the economics become less favorable.

To insure proper coupling of the shock wave in water with the meat to be tenderized, a density match is required. Meat is a good density match, but bones are not. Consequently, meat containing bones will not be uniformly affected by the shock wave; the bones reflect the shock wave producing regions partly untenderized and other regions almost entirely untenderized.

It is important that the meat be supported against a hard wall which will reflect the shock wave, preferably the wall of the tank. This prevents damage to the meat and also provides a substantial doubling effect of the shock wave as it is reflected from the wall of the tank.

The present system has the advantage of being very inexpensive on a per pound basis. It has the further advantage of not changing either the texture or the flavor of the meat, and it effects tenderizing of the meat from older animals which results in tenderized meat which is both flavorful and less expensive. It also tenderizes the meat uniformly.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. For example, the tank can be provided in other shapes, e.g. an elongated shape with the meat supported against steel plates and with plural explosive charges placed equidistantly along the tank between equally spaced meat supporting plates. It is to be understood that the phraseology or terminology employed herein is for the purpose of description and not of limitation.

What is claimed is:

1. In an apparatus for tenderizing meat by means of an explosive charge, comprising a liquid and meat holding tank, means for supporting an explosive charge within said tank, and cover means for said tank, the improvement comprising
doubling means for effecting a substantial doubling of a shock wave created by explosion of said explosive charge which passes through the meat and is then reflected to pass through the meat a second time in an opposite direction, said doubling means comprising support means in the form of a shock reflecting wall for supporting said meat located substantially equidistant from the locus of the explosive charge.

2. Apparatus according to claim 1, wherein said shock reflecting wall comprises a wall of said tank.

3. Apparatus according to claim 2, wherein said tank wall support means is hemispherical.

4. Apparatus according to claim 2, further comprising an at least partly flexible contained shaped to lay against said hemispherical tank wall support means, capable of containing a layer of meat of substantially constant thickness, and capable of being evacuated.

5. Apparatus according to claim 1, wherein said tank is supported on a recoil mechanism.

6. Apparatus according to claim 1, wherein said cover means comprises a generally frusto-conical shield to deflect water expelled by the explosion back into the tank.

7. Apparatus according to claim 6 further comprising a recoil mechanism mounted above said frusto-conical shield capable of moving upward with the onrushing of water.

8. Apparatus according to claim 1, wherein said cover means comprises a shield and support means for supporting said shield and permits said shield to move upwardly under the force of an explosion and then move downwardly in a controlled manner, said support means comprising a recoil mechanism.

9. Apparatus according to claim 1, further comprising means mounted above said cover means for permitting upward movement of said cover means upon means upon explosion followed by return of said cover means upon explosion followed by return of said cover means, causing an extension of explosion impulse over a longer term while decreasing force per unit of time.

10. Apparatus according to claim 4, wherein said at least partly flexible container is formed of rubber, plastic or both rubber or plastic.

11. An apparatus for tenderizing meat within an evacuated container within a bath of inert liquid using an explosive charge comprising:
a tank for containing a bath of inert liquid, said tank having a shock reflecting wall and means for supporting said meat in slabs against said shock reflecting wall at locations substantially equidistant from a detonation site within said tank; and
means for detonating an explosive at the detonation site to creates shock wave which propagates through said liquid and passes through the meat, and then is reflected from said shock reflecting wall to achieve a substantial doubling of the shock wave.

12. Tenderized meat having a substantially uniform degree of tenderization through its thickness and having broken connecting fibers without substantial rupture of meat cell walls, said tenderized meat being made by the process of immersing one or more slabs of substantially boneless meat contained within an evacuated container, in an explosion retaining tank containing a bath of inert liquid, including supporting said meat within said evacuated container against a hard shock reflecting wall within said liquid at locations substantially equidistant from the site of an explosive charge, and detonating said explosive charge within said liquid in said tank to generate and apply a shock front pressure wave propagated through the liquid to pass through said meat, and then reflect from said shock reflecting wall back through the meat to intersect with an incoming shock wave to achieve a substantial doubling of the shock wave.

13. Tenderized meat according to claim 12 selected from the group consisting of beef, port, mutton, veal, lamb, chicken and turkey.

* * * * *